Figure 1:
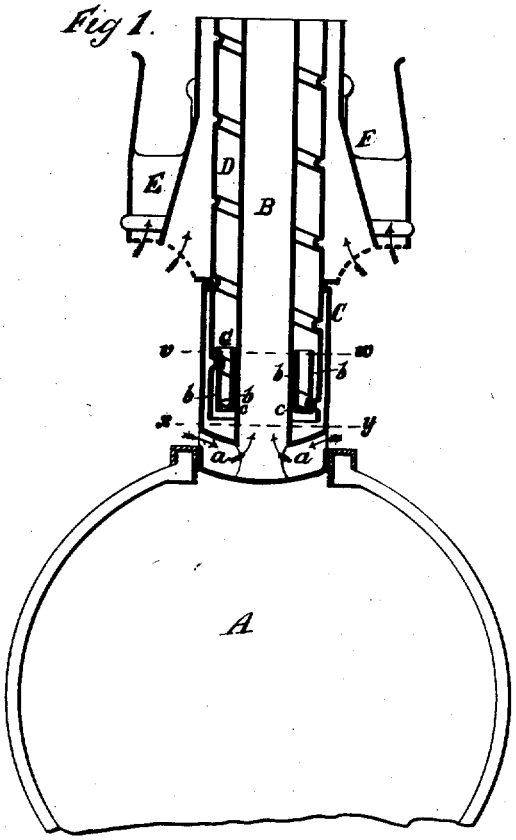

C. M. LUNGREN.

ARGAND LAMP BURNER.

No. 9,913. Reissued Oct. 25, 1881.

WITNESSES

J. J. Keane

Jas. R. Bowen.

INVENTOR

Charles M. Lungren

By his atty

Edwin H. Brown.

N. PETERS, Photo-Lithographer, Washington, D. C.

UNITED STATES PATENT OFFICE.

CHARLES M. LUNGREN, OF NEW YORK, N. Y.

ARGAND LAMP-BURNER.

SPECIFICATION forming part of Reissued Letters Patent No. 9,913, dated October 25, 1881.

Original No. 201,805, dated March 26, 1878. Application for reissue filed September 7, 1881.

*To all whom it may concern:*

Be it known that I, CHARLES MARSHALL LUNGREN, formerly of the city of Baltimore, in the State of Maryland, but now of the city of New York, in the State of New York, have invented certain Improvements in Argand Burners for Lamps, of which the following is a specification; and I do hereby declare that in the same is contained a full, clear, and exact description of my said invention, reference being had to the accompanying drawings, and to the letters of reference marked thereon.

This invention relates to certain improvements in Argand lamp-burners.

These improvements consist in the combination, in an Argand lamp-burner, of a screw-threaded open-bottom base for attaching the burner to an oil-reservoir, a central air-tube, a lateral air-passage establishing communication between the central air-tube and the exterior of the burner above the screw-threaded portion of the base, a wick-carrier arranged around the central air-tube above the lateral air-passage, and a rotary tube arranged above the lateral air-passage, engaging with the wick-carrier, and adapted to elevate or depress the same when rotated.

The improvements also consist in the combination, in an Argand lamp-burner, of a screw-threaded open-bottom base for attaching the burner to an oil-reservoir, a central air-tube, a lateral air-passage establishing communication between the central air-tube and the exterior of the burner above the screw-threaded portion of the base, a non-rotary and open-bottom wick-carrier arranged around the central air-tube above the lateral air-passage, and a rotary tube arranged above the lateral air-passage, engaging with the wick-carrier, and adapted to elevate and depress the same when rotated.

The improvements also consist in the combination, in an Argand lamp-burner, of a screw-threaded open-bottom base for attaching the burner to an oil-reservoir, a central air-tube, a lateral air-passage establishing communication between the central air-tube and the exterior of the burner above the screw-threaded portion of the base, a non-rotary open-bottom wick-carrier arranged around the central air-tube above the lateral air-passage, and a rotary tube supported on the base above the lateral air-passage, engaging with the wick-carrier, so that it will elevate or depress it when rotated, and, in conjunction with the central air-tube, forming the wick-tube of the burner.

The improvements also consist in the combination, in an Argand lamp-burner, of a screw-threaded open-bottom base for attaching the burner to an oil-reservoir, a central air-tube, a lateral air-passage establishing communication between the central air-tube and the exterior of the burner above the screw-threaded portion of the base, a non-rotary open-bottom wick-carrier arranged around the central air-tube above the lateral air-passage, a rotary tube supported on the base above the lateral air-passage, engaging with the wick-carrier, so that it will elevate or depress it when rotated, and, in conjunction with the central air-tube, forming the wick-tube of the burner, and a chimney-gallery connected to the said rotary tube.

In the description of the improved Argand burner which follows reference is made to the accompanying drawings, forming a part hereof, and in which—

Figure 2:
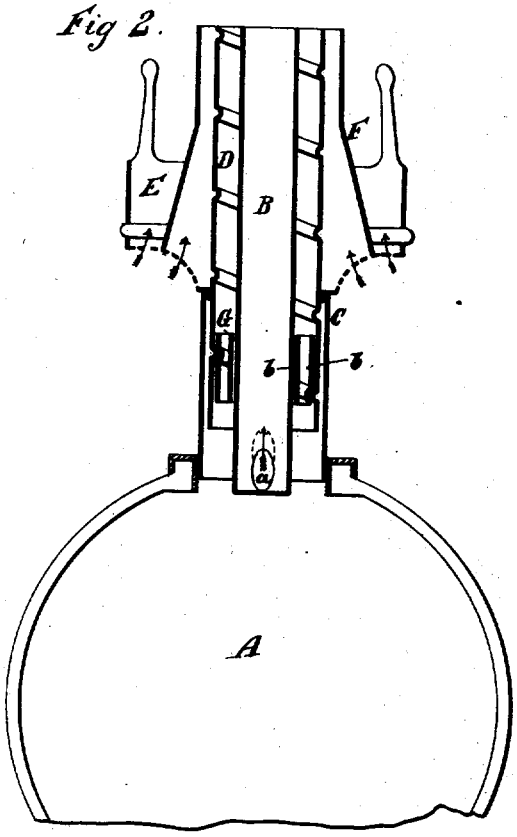
Figure 3:
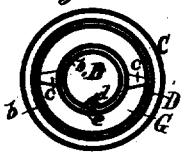
Figure 4:
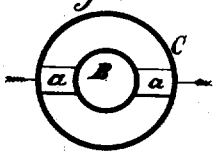

Figure 1 is a central vertical section of a lamp-burner embodying my improvements, and a portion of an oil-reservoir to which it is applied. Fig. 2 is a similar section of the same, taken at right angles to the former. Figs. 3 and 4 are transverse sections of the burner, respectively, on the lines *v w* and *x y*, Fig. 1.

Similar letters of reference designate similar parts in all the views.

A designates a fluid or oil reservoir of a lamp.

B designates the central air-tube of a lamp-burner, closed at its lower end and connected by means of the lateral air-passages or pipes *a* to the stationary tube C, which forms the base of the burner, and at the lower part is externally screw-threaded, so that it may be screwed into the reservoir A. The lateral air passages or pipes *a* establish communication between the exterior of the burner and the central air-tube, and form the only means for admitting air to the central air-tube and to the interior of the flame.

D is a rotary screw-threaded tube, to which the chimney gallery or supporter E and shield or deflector F are attached. This tube is supported above the lateral air-passages *a* by the base or tube C, as shown, through the chimney-gallery resting on the top thereof.

The shield or deflector F serves to conduct air to the exterior of the flame, the air being admitted to the shield or deflector through the lower portion of the chimney gallery or supporter. This rotary tube D and the central air-tube, B, together form the wick-tube of the burner.

The wick-carrier (represented by G) is formed of two cylindrical shells, *b*, connected by means of ribs *c*, and the outer shell is spirally grooved, in order that it may fit the projecting thread on the pipe D. It will be observed that this wick-carrier is open at the bottom.

The central air-tube, B, is provided with a groove, *d*, in its outer surface, extending longitudinally thereof, and the inner shell of the wick-carrier G is provided with a projection, *e*, which fits within the said groove, and thereby prevents the turning of the wick-carrier during the rotation of the threaded tube D, for the purpose of elevating and depressing the wick.

The direction of air-currents toward the flame is indicated by arrows.

In applying a cylindrical wick to the burner, the part thereof intended to project below the ribs of the wick-carrier is slit to allow the passage of the wick past the said ribs and below the lateral air passages or pipes *a*. This slitting of the wick does not in any manner impede the flow of oil or fluid through the same, or affect the flame in any manner.

The burner, constructed as described, is comparatively inexpensive. The air-passages *a* admitting a current of air to the interior of the flame, while the outer portion of the flame is supplied with air through the medium of the shield F, perfect combustion of the fluid is accomplished, and a brilliant white light produced free from smoke and unpleasant odor.

The burner, being complete in itself, is applicable for use in lamps of the ordinary description originally fitted with the common flat-wick burner without alteration of the lamp being made. This advantage will be appreciated when the superiority of the Argand principle is considered.

I do not claim, broadly, a detachable burner provided with a central tube having passages leading thereto from the outer air, as such a contrivance is not new; but,

Having thus described my invention, what I claim as new, and wish to secure by Letters Patent of the United States, is—

1. In an Argand lamp-burner, the combination of a screw-threaded open-bottom base for attaching the burner to an oil-reservoir, a central air-tube, a lateral air-passage establishing communication between the central air-tube and the exterior of the burner above the screw-threaded portion of the base, a wick-carrier arranged around the central air-tube above the lateral air-passage, and a rotary tube arranged above the lateral air-passage, engaging with the wick-carrier, and adapted to elevate or depress the same when rotated, substantially as specified.

2. In an Argand lamp-burner, the combination of a screw-threaded open-bottom base for attaching the burner to an oil-reservoir, a central air-tube, a lateral air-passage establishing communication between the central air-tube and the exterior of the burner above the screw-threaded portion of the base, a non-rotary and open-bottom wick-carrier arranged around the central air-tube above the lateral air-passage, and a rotary tube arranged above the lateral air-passage, engaging with the wick-carrier, and adapted to elevate and depress the same when rotated, substantially as specified.

3. In an Argand lamp-burner, the combination of a screw-threaded open-bottom base for attaching the burner to an oil-reservoir, a central air-tube, a lateral air-passage establishing communication between the central air-tube and the exterior of the burner above the screw-threaded portion of the base, a non-rotary open-bottom wick-carrier arranged around the central air-tube above the lateral air-passage, and a rotary tube supported on the base above the lateral air-passage, engaging with the wick-carrier, so that it will elevate or depress it when rotated, and, in conjunction with the central air-tube, forming the wick-tube of the burner, substantially as specified.

4. In an Argand lamp-burner, the combination of a screw-threaded open-bottom base for attaching the burner to an oil-reservoir, a central air-tube, a lateral air-passage establishing communication between the central air-tube and the exterior of the burner above the screw-threaded portion of the base, a non-rotary open-bottom wick-carrier arranged around the central air-tube above the lateral air-passage, a rotary tube supported on the base above the lateral air-passage, engaging with the wick-carrier, so that it will elevate or depress it when rotated, and, in conjunction with the central air-tube, forming the wick-tube of the burner, and a chimney-gallery connected to the said rotary tube, substantially as specified.

5. The base or tube C, central air-tube, B, and lateral air-passages *a*, combined with the rotary threaded pipe D and wick-carrier G, the latter consisting of the shells *b*, united by ribs *c*, substantially as specified.

In testimony whereof I have hereunto subscribed my name this 20th day of August, in the year of our Lord 1881.

C. M. LUNGREN.

Witnesses:
T. J. KEANE,
JAS. R. BOWEN.